United States Patent [19]

Yokoe et al.

[11] Patent Number: 4,791,680
[45] Date of Patent: Dec. 13, 1988

[54] IMAGE DATA CONVERTER

[75] Inventors: Tohru Yokoe, Yawata; Masahiro Shimizu, Katano; Mariko Takenouchi, Ibaraki, all of Japan

[73] Assignee: Matsushita Electric Industrial Co., Osaka, Japan

[21] Appl. No.: 843,999

[22] Filed: Mar. 25, 1986

[51] Int. Cl.⁴ .............................................. G06K 9/00
[52] U.S. Cl. ................................. 382/56; 358/261.1; 382/47
[58] Field of Search ................. 382/56; 358/260, 263, 358/261; 364/200, 549 B, 606, 564

[56] References Cited

U.S. PATENT DOCUMENTS

| | | | |
|---|---|---|---|
| 3,717,851 | 2/1973 | Cocke et al. | 364/200 |
| 4,270,148 | 5/1981 | Adachi | 358/260 |
| 4,276,544 | 6/1981 | Iinuma | 358/261 |
| 4,426,731 | 1/1984 | Edlund et al. | 382/56 |
| 4,441,208 | 4/1984 | Iida | 382/56 |
| 4,500,926 | 2/1985 | Yoshimaru | 358/260 |
| 4,520,506 | 5/1985 | Chan et al. | 382/56 |

Primary Examiner—Leo H. Boudreau
Attorney, Agent, or Firm—Spencer & Frank

[57] ABSTRACT

An image data converter for editing or displaying image data without a large bit image memory for storing bit image data of an entire image. The editing or display is performed in such a way that an inputted image data is compression-encoded in its plurality of blocks in the sub-scanning direction, the counted compressed data length of each block is stored, and thereafter a necessary block is scaled only in its predetermined area at a high speed to a predetermined scale.

5 Claims, 6 Drawing Sheets

FIG. 1

FIG. 2A
COMPRESSED DATA LENGTH MEMORY (15)

FIG. 2B
COMPRESSED DATA MEMORY (16)

IMAGE DATA CONVERTER

BACKGROUND OF THE INVENTION

1. Field of the Invention

This invention relates to an image dta converter and a method of converting image data therewith, used in constructing an electronic file system which performs image editing, such as image scaling up/down, area extraction and the like, of image data inputted by a scanner and the like, and permits the edited images to be registered and retrieved as image files.

2. Description of the Related Art

Conventional electronic file systems register image data inputted by a scanner and the like as image files in a file memory in a form converted into compressed data for reducing the amount of the data and, where image editing and an image display are intended, are adapted to restore in advance the entire image to bit image data.

Figure 10:
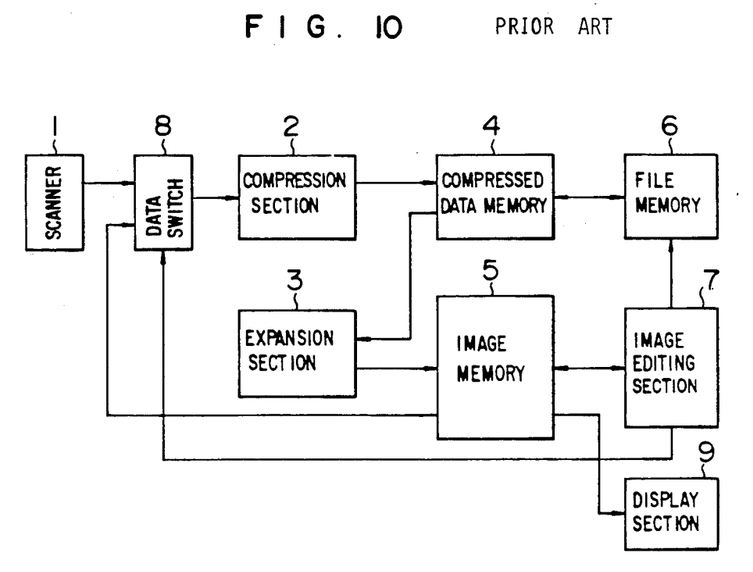
FIG. 10 is a block diagram of an electronic file system in the prior art.
Figure 11:
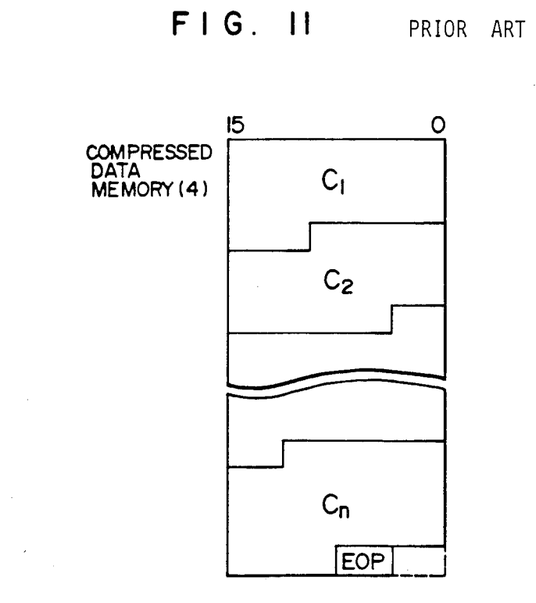
FIG. 11 is a format diagram of the compressed data memory in the prior art.

FIG. 10 shows one arrangement of the conventional electronic file systems. In this figure, image data supplied from a scanner 1 through scanning of a manuscript are sent to a compression section 2 via a data switch 8, and compression-encoded in the compression section 2, and the compression-encoded data are stored in a compressed data memory 4. As a compression-encoding method, a variable-length MH (Modified Huffman) encoding method with high compression efficiency is commonly used. As shown in FIG. 11, compressed data memory 4 is packed with an aggregate of the compressed data $C_1, C_2, \ldots, C_n$ corresponding to the respective lines in the form of 16 bits a word. A compression code EOP denotes an ending code. An expansion section 3 converts the contents of compressed data memory 4 into bit image data in order from the heading adress, and stores them in an image memory 5. An image editing section 7 registers the contents of compressed data memory 4 in a file memory 6 or retrieves necessary files from the file memory 6 to transfer them to compressed data memory 4. Moreover, when image editing such as image scaling up/down, area extraction and the like, and an image display are intended to be performed, the bit image data of the entire image must be stored in image memory 5 in advance. The contents of image memory 5 after the editing are displayed on a display section 9, and also converted into compressed data through data switch 8 and compression section 2 and the compressed data are stored in compressed data memory 4 and thereafter registered in file memory 6.

In the prior art, in performing the editing and display of the image, the compressed data must be always decoded in expansion section 3 in order from the heading address of compressed-data memory 4 so as to detect the top of every line in the compressed data memory 4. This results in poor operability because of the lengthened processing time. For this reason, with the entire image previously converted into bit image data being stored in image memory 5, and display of the image are performed for image memory 5. In this case, however, a large scale image memory for storing the bit image data of the entire image is required, disadvantageously causing the resultant system to be expensive.

SUMMARY OF THE INVENTION

An object of this invention is to provide an image data converter necessary for constructing an electronic file system which is capable of performing editing or display of images at a high speed without any large image memory for storing the bit image data of an entire image on a manuscript.

In order to meet this object, in accordance with this invention, there is provided an image data converter comprising a compression section for converting the bit image data of each of a plurality of blocks of an image dividied in the sub-scanning direction into compressed data and counting the compressed data length of each block, a compressed data length memory for storing the counted compressed data lengths, a compressed data memory for storing the compressed data, an expansion section for converting into bit image data on a predetermined scalea predetermined area of the compressed data of each block, for each block, and an image memory for storing the bit image data.

DESCRIPTION OF THE PREFERRED EMBODIMENTS

Figure 1:
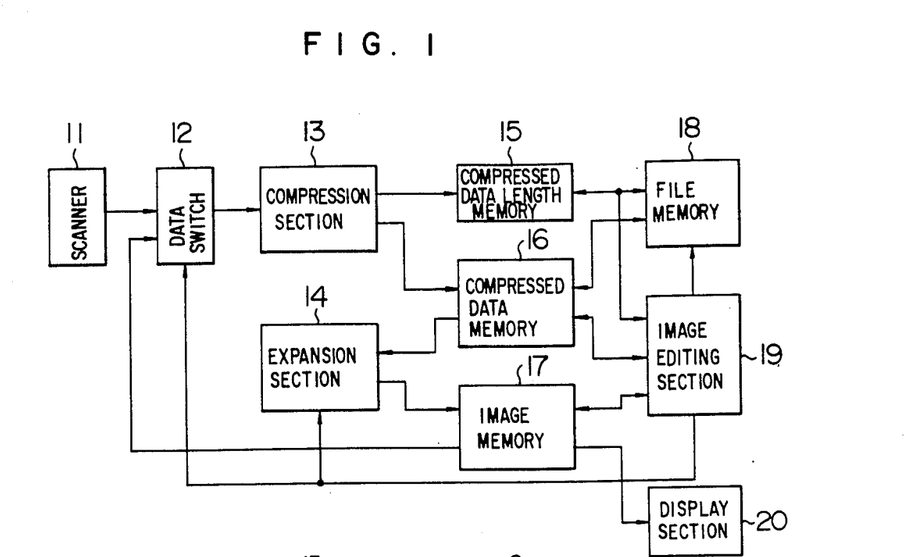
FIG. 1 is a block diagram of an electronic file system employed in one embodiment of this invention.
Figure 2A:
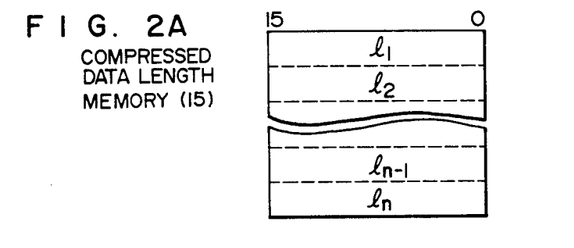
FIGS. 2A and 2B show data formats of the compressed data length memory and the compressed data memory employed in this embodiment, respectively.
Figure 2B:
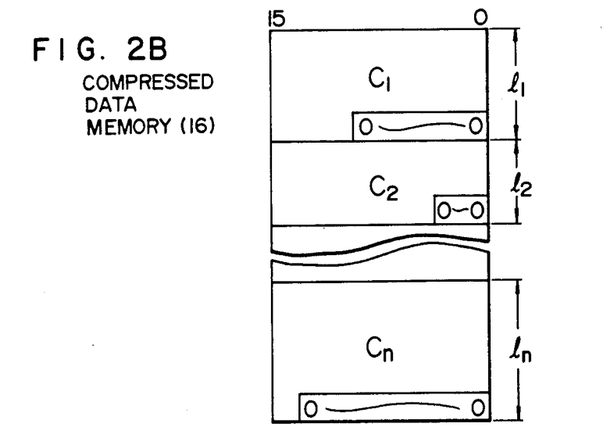

FIG. 1 shows a block diagram of the electronic file system employed in one embodiment according to this invention. Image data supplied from a scanner 11 through scanning of an image are compression-encoded by a compression section 13 line-by-line through a data switch 12 and the compression-encoded data (compressed data) are stored in a compressed data memory 16. As a compression-encoding method, the MH enboding method is used. Compression section 13 counts the length (compressed data length) compressed of each line, which length is stored in a compressed data length memory 15. The compressed data length memory 15 and the compressed data memory 16 have data formats as shown in FIGS. 2A and 2B, respectively. In FIGS. 2A and 2B, $L_i$ ($i=1, 2, \ldots, n$) is the number of words corresponding to the compressed data length on each line, where a word consists of 16 bits. In FIG. 2B, $C_i$ ($i=1, 2, \ldots, n$) designates the compressed data on each line, to which a variable-length signal series of '0' is added so as to be an integer multiple of 16 bits/w (16 bits per word). The variable-length signal series of '0' is a dummy code which is not generally defined in the MH encoding method and so will be referred to as a dummy code '0' hereafter. Expansion section 14 converts the preset (predetermined) areas of the contents of compressed data memory 16, which are scaled up or down to a preset (predetermined) scale, into image data line-by-line, which are stored in an image memory 17.

Figure 3:
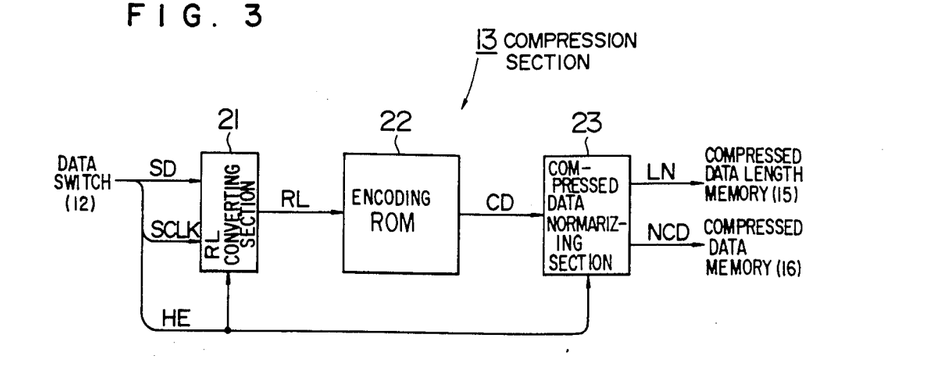
FIG. 3 is a block diagram of the compression section used in this embodiment.

An arrangement of compression section 13 in one embodiment of this invention is shown in FIG. 3. The bit image serial data SD are supplied to an RL (runlength) converting section 21 together with a synchronous clock SCLK and a line enable signal HE from data switch 12, and converted into a runlength code RL. The runlength code RL is an address of an encoding ROM 22, which sends compressed codes CD to a compressed data normalizing section 23. Compressed data normalizing section 23 performs serial-parallel conversions of the compressed codes CD in the form of 16 bits/w, and sends compressed data NCD, to which are added the dummy codes '0' to adjust the compressed data length in the form of 16 bits/w, to compressed data memory 16 at the end of the line enable signal HE. Compressed data normalizing section 23 also counts the bit length of the compressed code CD and sends the compressed data length LN divided by 16 to compressed data length memory 15.

Figure 4:
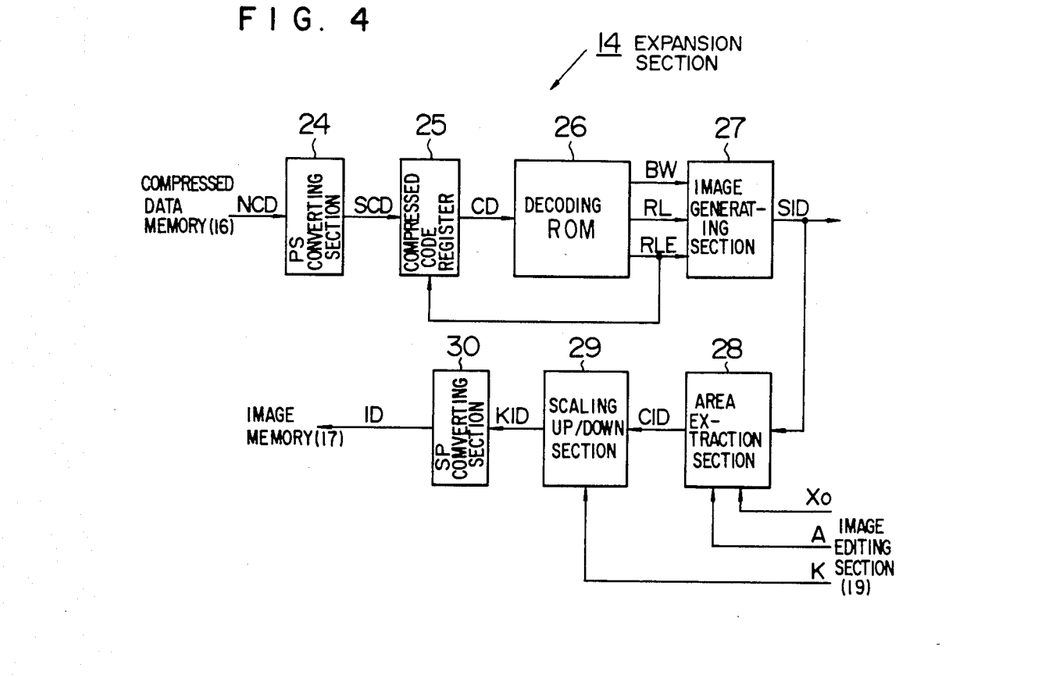
FIG. 4 is a block diagram of the expansion section used in this embodiment.

An arrangement of expansion section 14 in one embodiment of this invention is shown in FIG. 4 Compressed data memory 16 which is filled with the variable-length compressed codes is constructed in the form of 16 bits/w, and the compressed data NCD which are sent to expansion section 14 from compressed data memory 16 are required to be inputted into a compressed code register 25 one bit each so as to expand the compressed data NCD. The compressed data NCD from compressed data memory 16 are converted into serial compressed data SCD in a PS converting section 24. The serial compressed data SCD are sent to compressed code register 25, shifting every one bit. The output CD from compressed code register 25 is an address of a decoding ROM 26, which produces a black/white specifying signal BW, runlength codes RL and a code matching signal RLE which shows whether the output CD from compressed code register 25 has been matched to a predetermined code series. An image generating section 27 generates bit image serial data SID based on the signal BW and the runlength code RL when the code matching signal RLE is produced.

Figure 5:
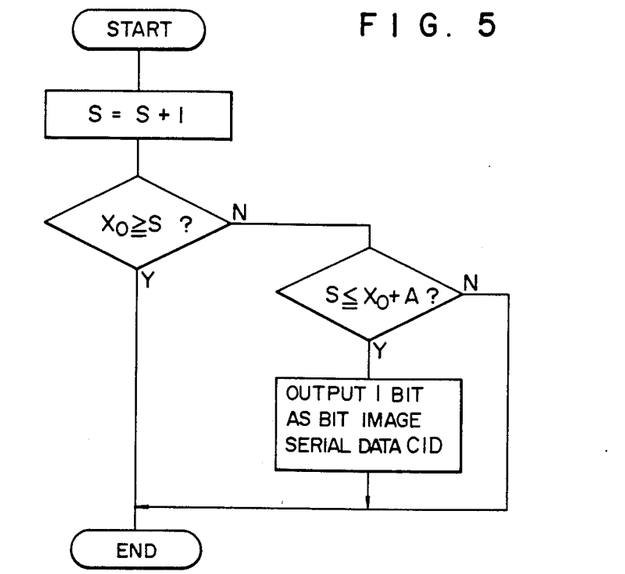
FIG. 5 is a processing flow chart in the area extraction section of the expansion section used in this embodiment.

The operation of an area extracting section 28 will be explained with reference to the processing flow shown in FIG. 5. In this figure, $X_o$, A and S denote an area starting address, an area width in the main scanning direction and an extraction control counter, respectively. The extraction control counter S is cleared to '0' by an image editing section 19 before the processing of each line. The area starting address $X_o$ and the main scanning direction area width A are signals provided by image editing section 19. In area extracting section 28, after 1 is added to the extraction control counter S upon each inputting of one bit of the bit image serial data SID, then only when $X_o < S \leq X_o + A$ is satisfied, the inputted one bit is outputted as a bit image serial data CID as it is. Thus, only the section corresponding to the main scanning direction area width A from the area starting address $X_o$, of the bit image serial data CID is sent to a scaling up/down section 29 as bit image serial data CID.

Figure 6:
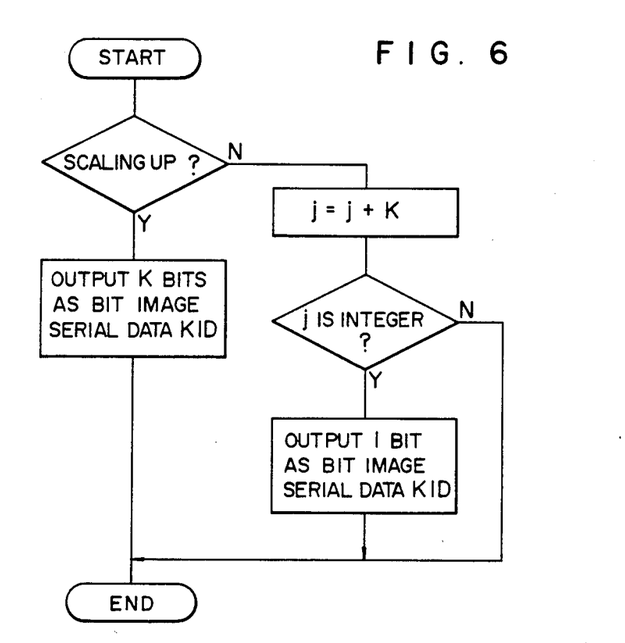
FIG. 6 is a processing flow chart of a scaling up/down section in the expansion section used in this embodiment.

The operation of scaling up/down section 29 will be explained with reference to the processing flow shown in FIG. 6. In FIG. 6, K denotes a scale which is a signal sent from image editing section 19, ad j denotes a scale control counter which is cleared to '0' by image editing section 19 before the processing for each line. In scaling up/down section 29, when each one bit of the bit image serial data CID is inputted, in the case of its scaling up, K bits of the input value are outputted as bit image serial data KID. On the other hand, in the case of its scaling down, after $j = j + K$ has been satisfied, only when j is an integer, one bit of the input value is outputted as the bit image serial data KID. Thus, the bit image serial data CID are converted into the bit image serial data KID by scaling up/down with the scale K, which are sent to an SP converting section 30.

Image memory 17 is constructed in the form of 16 bits/w. Therefore, SP converting section 30 to which the bit image serial data KID are sent outputs one word to image memory 17 as bit image data ID, whenever 16 bits of the bit image serial data KID are inputted to SP converting section 30. Also, compressed code register 25 is reset by the code matching signal RLE. Thus, when the following serial compresse data SCD is supplied to compressed code register 25, the processing is continued.

Figure 7:
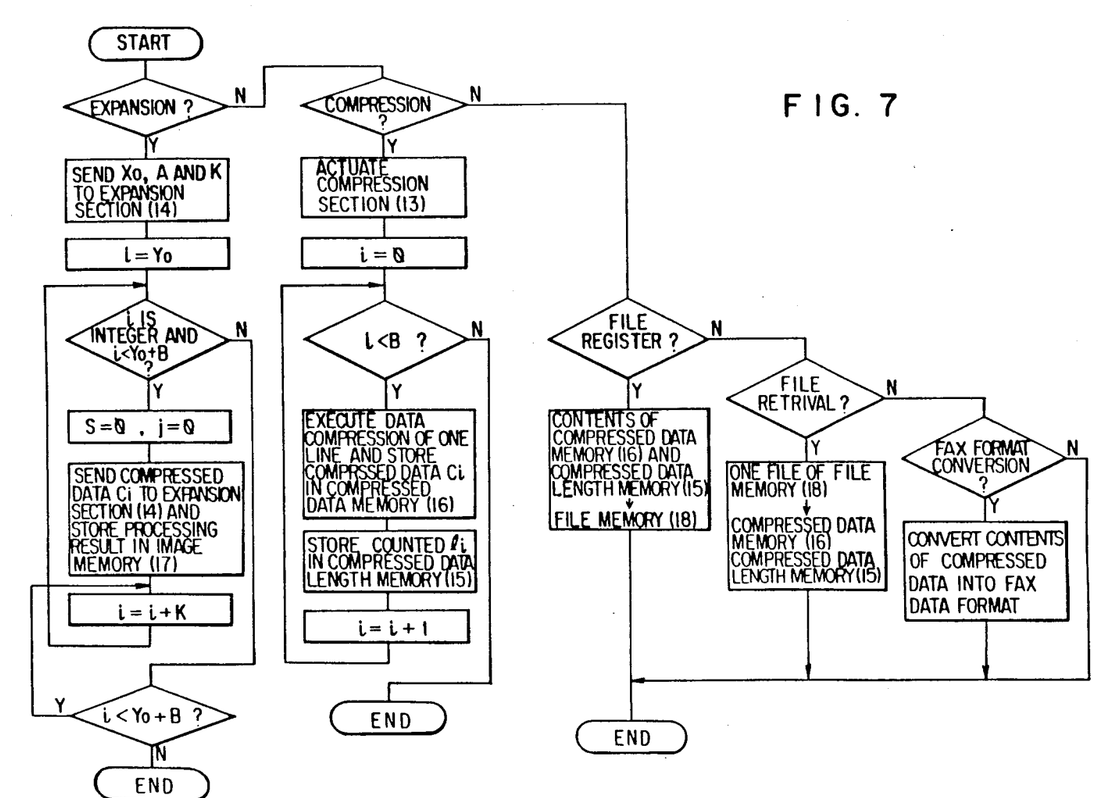
FIG. 7 is a processing flow chart in the image editing section used in this embodiment.
Figure 8:
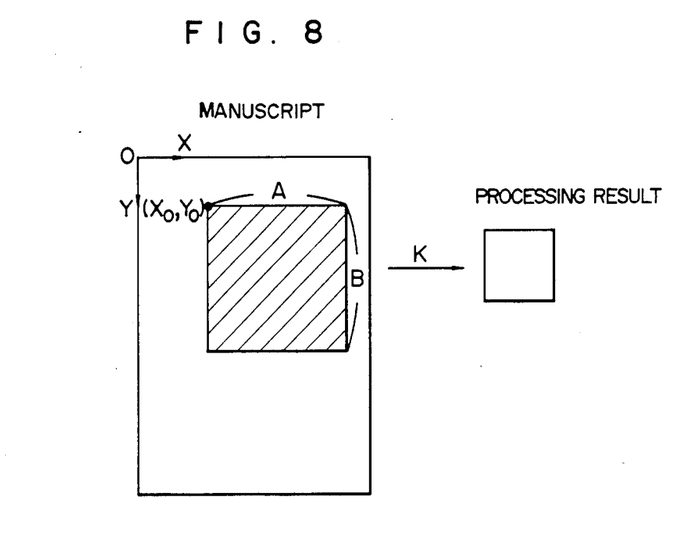
FIG. 8 is a diagram for explaining the function of the image editing section used in this embodiment.

The operation of image editing section 19 will be explained with reference to the flow chart of FIG. 7. In this figure, $X_o$ denotes a main scanning area starting address, $Y_o$ denotes a sub-scanning direction area starting address. A denotes a main scanning area width. B denotes a sub-scanning direction area width, K denotes a scale, S denotes an extraction control counter employed in FIG. 5, j denotes a scale control counter employed in FIG. 6, and i denotes an image editing control counter. FIG. 8 shows a part of the manuscript compression-encoded when after it is expanded, it is subjected to the area extraction and the scaling on the basis of the starting coordinate ($X_o$, $Y_o$), the area size (A, B) and the scale K ($= m$ or $1/m : m = 1, 2, \ldots, 8$) which are specified area information externally given, so as to be converted into the bit image data. The parameters $X_o$, $Y_o$, A, B and K used in FIG. 7 correspond to the like characters in FIG. 8.

When the compressed data are expanded, image editing section 19 sends the main scanning area starting address $X_o$, main scanning direction area width A and the scale K to expansion section 14, and sends the sub-scanning direction area starting address $Y_o$ to the image editing control counter i. Next, after the extraction control counter S and the scaling control counter j are cleared to '0', the storing address of the compressed data on a required line is calculated from compressed data length memory 15 and the compressed data relative to one line corresponding to the required line in compressed data memory 16 is transfered to expansion section 14. The bit image data thus generated are stored in image memory 17. When the processing relative to one line is terminated, $i = i + K$ is executed. And only when i is an integer and $i < Y_o + B$, the above transfer is performed, and when $i \geq Y_o + B$, the processing is terminated.

Where the bit image data are compressed, image editing section 19 actuates compression section 13 to clear the image editing control counter i to '0'. Next, the bit image data sent from image memory 17 or scanner 11 are sent to compression section 13 through data switch 12, and the counted compressed data length and the converted compressed data are stored in compressed data length memory 15 and compressed data memory 16, respectively. When the procesing relative to each one line is terminated, $i=i+1$ is and, the above processing is continued until $i \geq B$. Erasion, shift, etc. of lines can be performed by directly processing compressed data length memory 15 and compressed data memory 16.

In registration and retrieval of files, image editing section 19 registers the contents of compressed data length memory 15 and compressed data memory 16 in file memory 18 as a file, or retrieves them from file memory 18 to transfer them to compressed data length memory 15 and compressed data memory 16.

Figure 9:
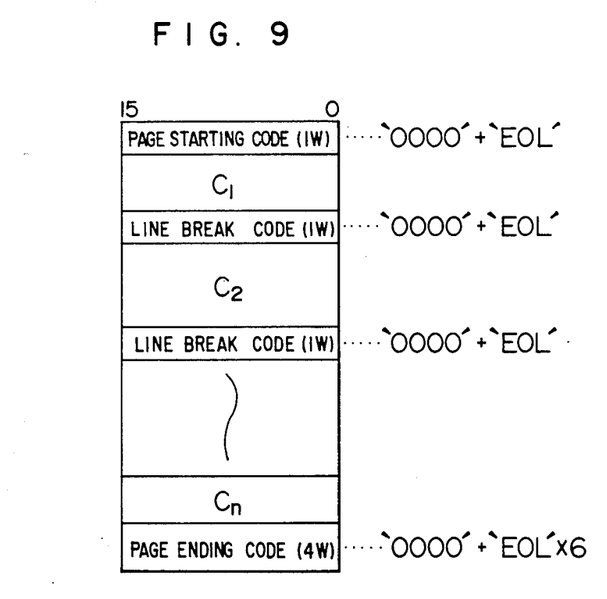
FIG. 9 is a format diagram of a facsimile (FAX) data.

Further, image editing section 19 provides the compressed data generated by compressing section 13, as shown in FIG. 2B, with a page starting code (dummy code '0000'+EOL code), line breaking code (dummy code '0000'+EOL code) and page ending code (EOL code×6+ dummy code 0000') to convert them into a standardized Fax data format shown in FIG. 9. EOL code is a line ending code that is a signal series '000000000001'.

In this embodiment, in order to access to the compressed data on any line, the compressed data length on each line is stored to calculate the storing address of the compressed data on a necessary line, but to this end a method of directly storing the storing address can be adopted. Although in this embodiment, the compression and expansion of image data is performed for each one line, they can also easily be performed for each block consisting of plural lines in the sub-scanning direction. Further, although the compression-encoding method adopts the MH encoding method, the other encoding method can be adopted by allotting undefined variable length code series to its codes as dummy codes.

According to this invention, since the compressed data length of each block is calculated and stored at the time of compression of the image data, a break of each block of the compressed data can be easily calculated and an expansion of only the required area can be performed at a high speed through area extraction and scaling up/down, so that the editing and display of the image can be performed without the memory for storing the bit image of the entire image.

Moreover, the compressed data generated in accordance with this invention can be easily converted into a standardized Fax data format by using the MH encoding method as a compression-encoding method, which permits image communication using a facsimile to be practiced.

An image data converter such as this invention is indispensable to implement inexpensive personal computers, word processors and image work-stations which has functions of inputting, editing, display and communication of image data.

We claim:

1. An image data converter comprising:
a compression section for converting the bit image data of each of a plurality of blocks of an image divided in the sub-scanning direction into compressed data and counting the compressed data length of each block;
a compressed data length memory for storing the counted compression data lengths of the blocks;
a compressed data memory for storing the compressed data;
an expansion section;
an image editing section having means, coupled to said compressed data length memory, for determining which of the compressed data in said compressed data memory corresponds to the blocks of bit image data in a specified area of the image, based on the counted compressed data lengths stored in said compressed data length memory, and for sending all of the determined compressed data in said compressed data memory to said expansion section, said expansion section including
decoding means for decoding the determined compressed data from said compressed data memory into bit image data,
a scaling means, and
area extraction means, responsive to a signal desgnating the specified area of the image, for specifying what bit image data from said decoding means corresponds to the specified area, and outputting to said scaling means only bit image data corresponding to the specified area, said scaling means comprising means for scaling one of up and down the bit image data output thereto by said area extraction means, with a predetermined scaling factor different than 1, and outputting the scaled bit image data; and
an image memory for storing the scaled bit image data output by scaling means.

2. An image data converter comprising:
a compression section for converting the bit image data of each of a plurality of blocks of an image divided in the sub-scanning direction into compressed data by compression encoding and counting the compressed data length of each block to add a variable-length dummy code to said compressed data so that said compressed data length is an integer multiple of one word;
a compressed data length memory for storing the counted compressed data lengths of the blocks;
a compressed data memory for storing the compressed data;
an expansion section;
an image editing section having means, coupled to said compressed data length memory, for determining which of the compressed data in said compressed data memory corresponds to the blocks of bit image data in a specified area of the image, based on the counted compressed data lengths stored in said compressed data length memory, and for sending all of the determined compressed data in said compressed data memory to said expansion section, said expansion section including
decoding means for decoding the determined compressed data from said compressed data memory into bit image data,
a scaling means, and
area extraction means, responsive to a signal designating the specified area of the image, for specifying what bit image data from said decoding means corresponds to the specified area, and outputting to said scaling means only bit image data corresponding to the specified area, said scaling means comprising means for scaling one of up and down the bit image data output thereto by said area extraction means, with a predetermined scaling factor different than 1, and outputting the scaled bit image data; and
an image memory for storing the scaled bit image data output by said scaling means.

3. An image data converter as claimed in claim 2, wherein the compression-encoding in said compression section is performed by an MH encoding method.

4. An image data converter as clamed in claim 3, wherein said dummy code is a variable-length signal series of '0"s.

5. An image data conversion method comprising the steps of:
 (a) dividing an image into a plurality of blocks in the sub-scanning direction;
 (b) converting the bit image data of each of the plurality of blocks into respective blocks of compressed data;
 (c) counting the compressed data length of each of the blocks of compressed data;
 (d) storing the blocks of compressed data and the compressed data lengths in a memory;
 (e) specifying area information defining a specified area of the image and reading out a number of blocks of the compressed data corresponding to the specified area from the memory on the basis of the specified area information and the compressed data lengths of the number of blocks;
 (f) decoding the number of blocks of compressed data read out into bit image data;
 (g) determining which bit image data decoded from the number of blocks corresponds to the specified area, based on the specified area information;
 (h) extracting the bit image bit determined to correspond to the specified area from the bit image data decoded from the number of blocks;
 (i) scaling the extracted bit image data one of up and down; and
 (j) storing the scaled bit image data in a further memory.

* * * * *